United States Patent [19]

Aine

[11] 4,021,766
[45] May 3, 1977

[54] SOLID STATE PRESSURE TRANSDUCER OF THE LEAF SPRING TYPE AND BATCH METHOD OF MAKING SAME

[76] Inventor: Harry E. Aine, 1804 Stierlin Road, Mountain View, Calif. 94040

[22] Filed: July 28, 1975

[21] Appl. No.: 599,768

[52] U.S. Cl. .............................. 338/2; 29/576 R; 29/580; 29/592; 29/610.5 G; 338/4; 338/42; 357/26
[51] Int. Cl.² .................................... G01L 1/22
[58] Field of Search .......... 29/610.5 G, 595, 576 R, 29/576 W, 580, 581, 582, 583, 592; 357/26, 79; 338/4, 2, 36, 41, 42

[56] References Cited
UNITED STATES PATENTS

| | | | |
|---|---|---|---|
| 3,093,806 | 6/1963 | Gutterman | 338/42 |
| 3,328,653 | 6/1967 | Wolf, Jr. | 357/26 |
| 3,417,361 | 12/1968 | Heller et al. | 29/576 X |
| 3,757,414 | 9/1973 | Keller | 29/580 |
| 3,820,401 | 6/1974 | Lewis | 338/4 X |
| 3,853,650 | 12/1974 | Hartlaub | 29/580 X |

Primary Examiner—Victor A. DiPalma
Attorney, Agent, or Firm—Lowhurst & Aine

[57] ABSTRACT

Solid state leaf spring pressure transducers are fabricated by batch photolithographic and etching techniques from a monocrystalline material, such as silicon. The leaf spring structures include elongated gaps separating adjacent leaf spring leg portions from each other and from a surrounding support structure defined by the intervening region of the wafer disposed inbetween adjacent leaf spring structures. An array of fluid tight partitions are sealed at their outer peripheries to the adjacent support structure. Compliant portions of the partitions are individually coupled to individual ones of the spring structures for movement therewith. In one embodiment, the gaps between adjacent leg portions of the individual springs and the surrounding support structure are sealed by a fluid tight web deposited over the major face of the wafer containing the batch of spring structures. In another embodiment, a web or membrane which is deposited or formed over the major face of the wafer has corrugated diaphragms formed therein. In another embodiment, a membrane is deposited over the major face of the wafer containing the batch of spring structures. In another embodiment the partitioning structure comprises a second wafer sealed over the first wafer.

21 Claims, 16 Drawing Figures

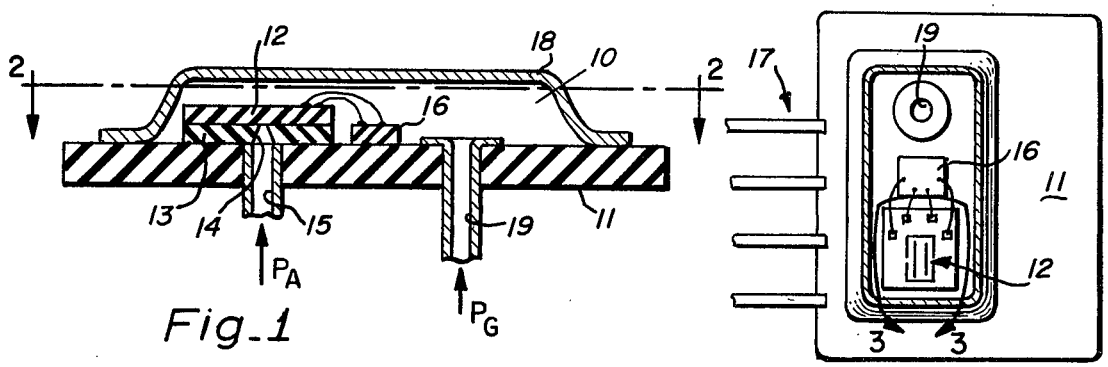
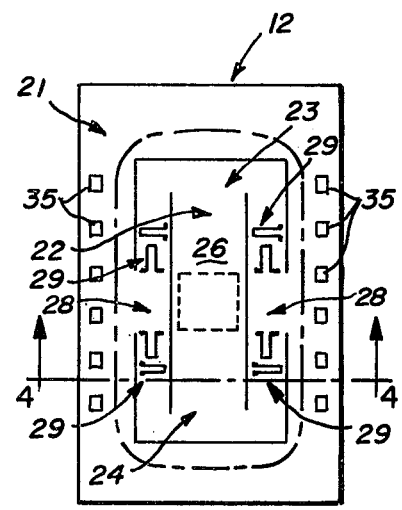
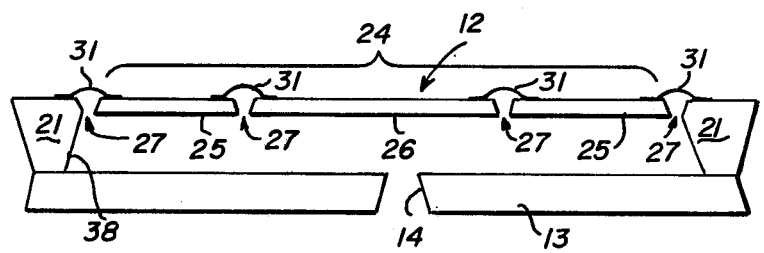
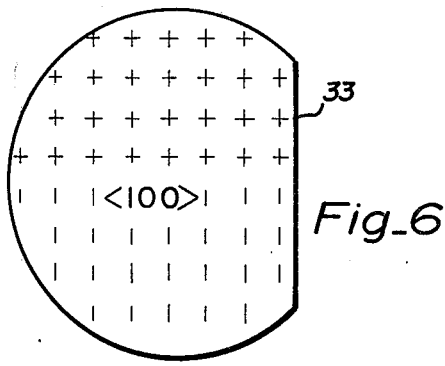
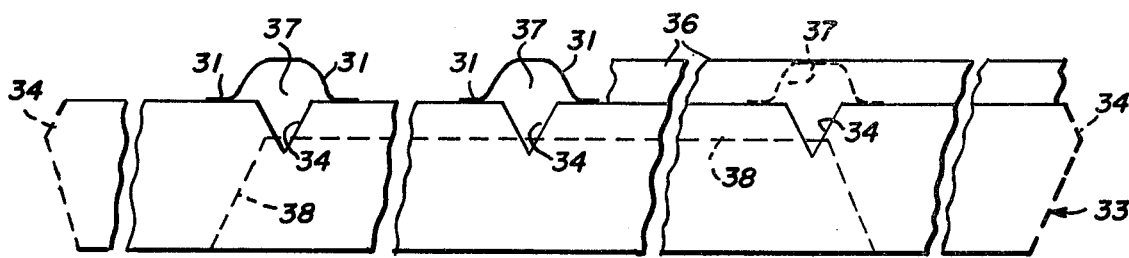

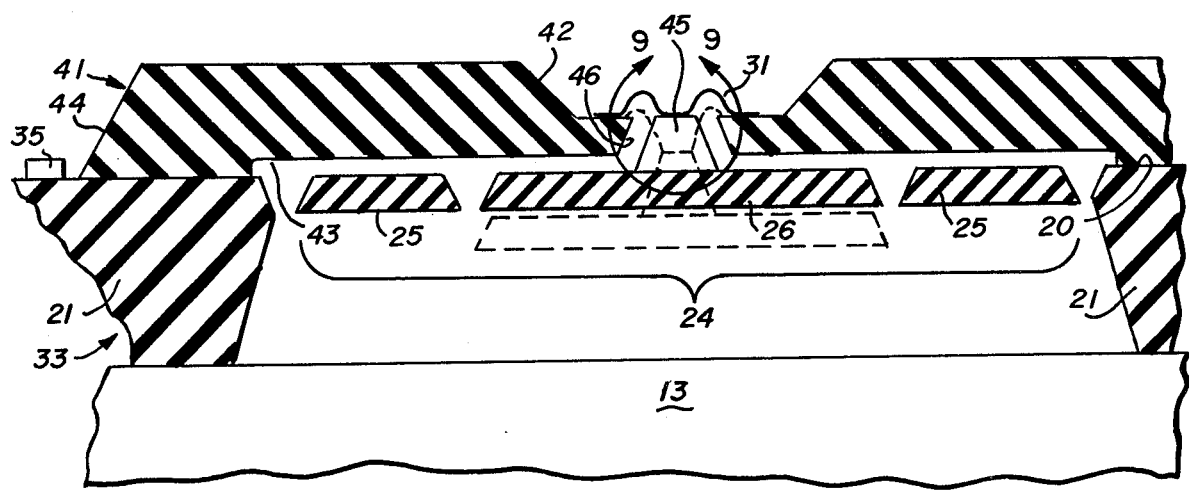
Fig_8
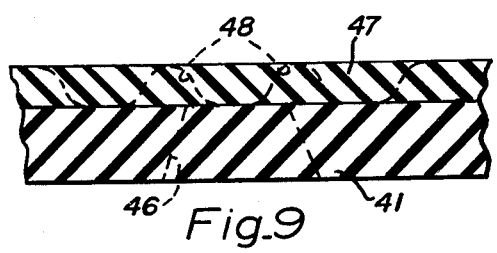
Fig_9
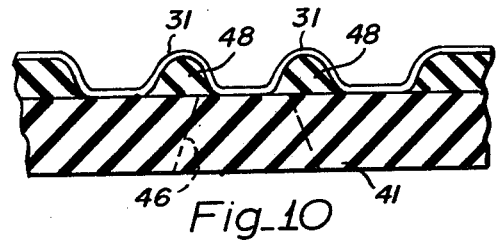
Fig_10
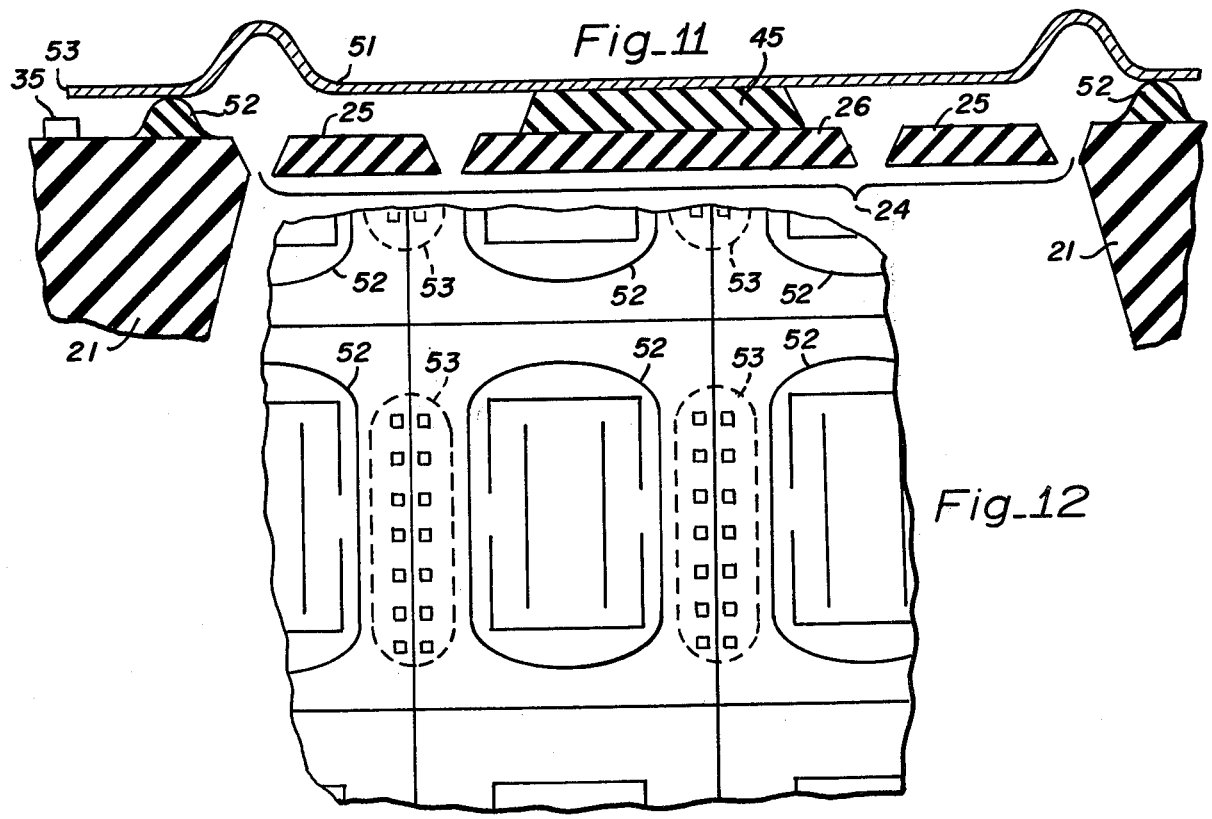
Fig_11
Fig_12

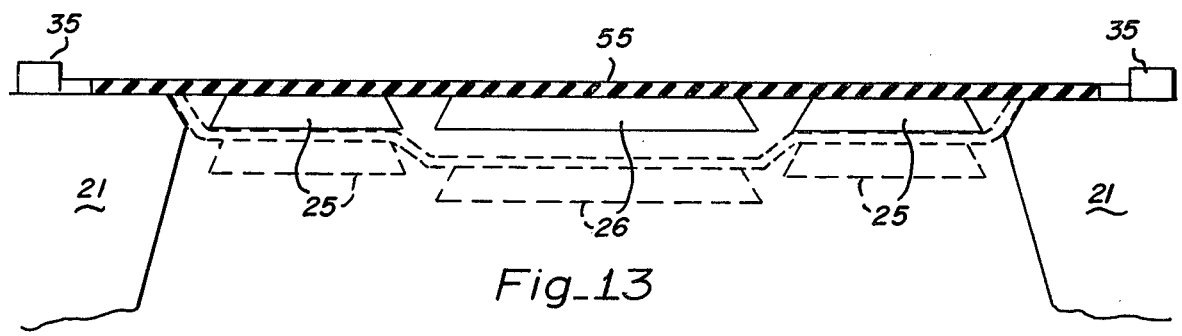
Fig_13
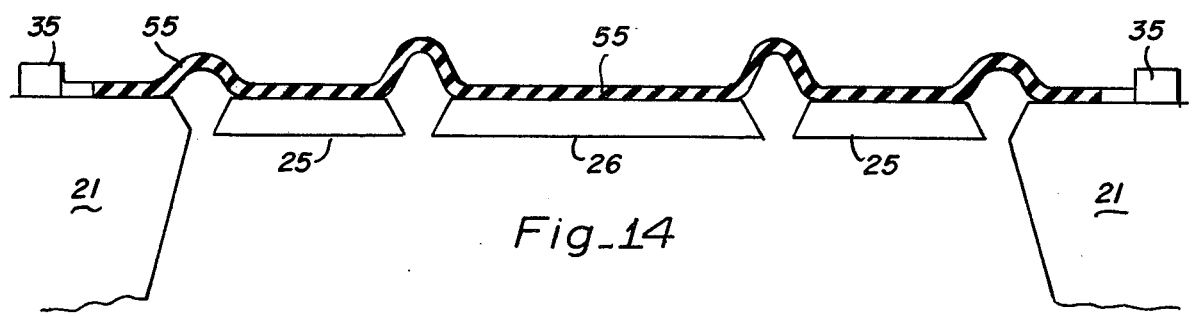
Fig_14
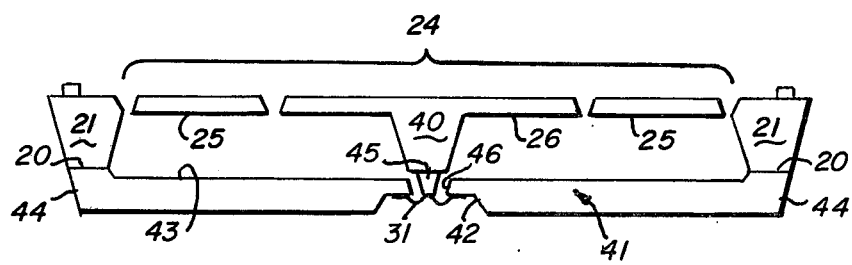
Fig_15
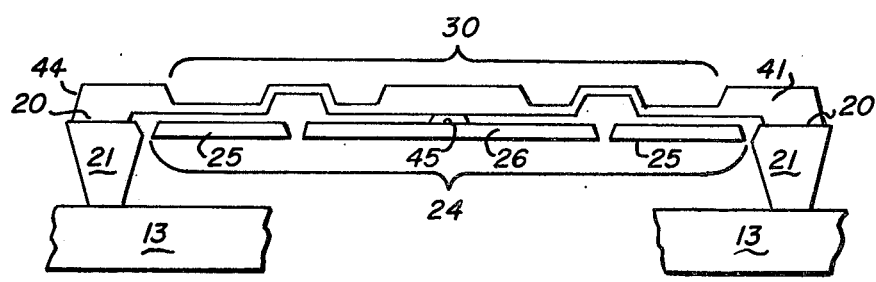
Fig_16

SOLID STATE PRESSURE TRANSDUCER OF THE LEAF SPRING TYPE AND BATCH METHOD OF MAKING SAME

BACKGROUND OF THE INVENTION

The present invention relates in general to solid state pressure transducers and, more particularly, to a method for making such pressure transducers of a type utilizing a leaf spring structure.

DESCRIPTION OF THE PRIOR ART

Heretofore, solid state pressure transducers have been fabricated in batches by etching a pattern of recesses in the backside of a monocrystallline silicon wafer to leave a pattern of thin diaphragms on the front surface of the wafer. The diaphragms were supported at their periphery by the intervening regions of the wafer separating adjacent diaphragms. Piezoresistive elements were diffused into the surface of the diaphragms for detecting strain in the diaphragms as a function of the pressure differential thereacross. Such solid state pressure transducers are disclosed in U.S. Pat. Nos. 3,417,361 issued Dec. 17, 1968 and 3,757,414 issued Sept. 11, 1973 and in an article titled "Solid State Digital Pressure Transducer" appearing in the *IEEE Transactions on Electrical Devices*, Vol. ED-16, No. 10, of October 1969.

It is also known from the prior art to batch fabricate solid state force transducers of the leaf spring type wherein a silicon monocrystalline wafer is etched from the top surface to a relatively shallow depth to define a leaf spring structure, preferably of the double E-shape. The wafer is then etched from the backside to intersect a recess with the spring pattern etched from the front side to define the leaf spring structure supported from a surrounding support structure formed by the intervening region of the wafer between adjacent leaf springs. Piezoresistive elements were diffused into the leaf springs in the regions of maximum stress to derive an output proportional to the force exerted on the leaf spring portion of the transducer.

The leaf spring structure includes gaps between the surrounding support structure and the leaf spring and, in addition, between adjacent legs of the leaf spring so that fluid communication is obtained through the leaf spring structure. This prevents its use as a static pressure transducer because a static fluid pressure differential cannot be supported across the perforated leaf spring structure.

SUMMARY OF THE PRESENT INVENTION

The principal object of the present invention is the provision of a solid state pressure transducer of the leaf spring type and of a batch method of making same.

In one feature of the present invention, a batch of leaf spring patterns are formed in a wafer, individual leaf springs being supported by intervening regions of the wafer, and wherein a batch of fluid tight partitioning structures are sealed across the individual support structures, such partitioning structures including a compliant portion coupled with individual ones of the spring structures for movement therewith.

In another feature of the present invention, the partitioning structure for partitioning the individual leaf springs comprises formation of a pattern of recesses in a second wafer, the second wafer being sealed over the first wafer in fluid tight relation with the recesses in alignment with the individual spring structures.

In another feature of the present invention, the partitioning structure includes a sheet having a pattern of compliant diaphragm portions formed therein, such sheet being sealed over the surface of the wafer having the leaf spring portions formed therein.

In another feature of the present invention, the individual leaf spring structures in a wafer are sealed in a fluid tight relation by sagging a unitary compliant membrane into supportive engagement with the leaf spring structures and sealing the membrane thereto.

In another feature of the present invention, a batch of leaf spring transducers in a wafer are sealed by forming a pattern of strippable material over the major face of the wafer and then depositing, as by vacuum evaporation, sputtering or electrodeposition, a thin compliant membrane material over the face of the wafer. The strippable material is then stripped leaving the wafers sealed by the deposited compliant membrane.

Other features and advantages of the present invention will become apparent upon a perusal of the following specification taken in connection with the accompanying drawings wherein:

BRIEF DESCRIPTION OF THE DRAWINGS

FIG. 1 is a longitudinal sectional view of a pressure transducer incorporating features of the present invention, FIG. 2 is a sectional view of the structure of FIG. 1 taken along line 2—2 in the direction of the arrows, FIG. 3 is a plan view of a leaf spring pressure transducer portion of the structure of FIG. 2 delineated by line 3—3, FIG. 4 is an enlarged sectional view of a portion of the structure of FIG. 3 taken along line 4—4 in the direction of the arrows, FIG. 5 is a side elevational view of a wafer utilized in the fabrication of the pressure transducers of the present invention, FIG. 6 is a plan view of the wafer of FIG. 5 having an array of leaf spring patterns formed therein, FIG. 7 is an enlarged schematic sectional view depicting a first step in the fabrication of the leaf spring transducers of the present invention, FIG. 8 is a sectional view similar to that of FIG. 4 depicting an alternative embodiment of the present invention, FIG. 9 is an enlarged detail view of a portion of the structure of FIG. 8 delineated by line 9—9 and depicting the steps in the fabrication of the sealing diaphragm of FIG. 8, FIG. 10 is a view similar to that of FIG. 9 depicting a subsequent step in the process of fabrication of the diaphragms, FIG. 11 is a view similar to that of FIG. 8 depicting an alternative embodiment of the present invention, FIG. 12 is a plan view of a wafer of the present invention depicting an intermediate step in the process of sealing the individual leaf spring structures in a fluid tight manner, FIG. 13 is a sectional view similar to that of FIG. 11 depicting a step in an alternative method for sealing of the individual leaf springs, FIG. 14 is a view similar to that of FIG. 13 depicting the diaphragm thereof in the completed state, FIG. 15 is a view to that of FIG. 8 depicting an alternative embodiment of the present invention, and FIG. 16 is a view similar to that of FIG. 8 depicting an alternative embodiment of the present invention.

DESCRIPTION OF THE PREFERRED EMBODIMENTS

Referring now to FIGS. 1 and 2 there is shown a pressure measuring device incorporating features of the present invention. More particularly, a ceramic base plate structure 11 has a solid state pressure transducer 12, incorporating features of the present invention, affixed thereto via a support plate 13, as of silicon. The support plate 13 is affixed to the ceramic base plate 11 by conventional die attach techniques. Support plate 13 includes a central opening 14 therein disposed in alignment with a tube 15 passing through and being sealed to an aperture in the ceramic plate 11. In the case of a pressure gauge, atmospheric pressure is transmitted to the backside of the leaf spring pressure transducer 12 via tubulation 15 and the aperture 14 in the base plate 13 of the transducer 12. Output electrical signals derived from the transducer 12 are fed via wire leads to an integrated amplifier circuit 16 carried from the base plate 11. The amplified and perhaps processed electrical signals derived from the amplifier 16 are fed to associated circuitry via one or more output terminals of an input output terminal array 17. A cap 18 is sealed in a gas tight manner to the base plate 11 to define chamber 10. A pressure PG to be measured is fed into the chamber 10 containing the pressure transducer 12 via input tubulation 19 passing through an aperture in the base plate 11 and being sealed thereto.

Referring now to FIGS. 3 and 4 the pressure transducer 12 is shown in greater detail. Briefly, the pressure transducer 12 includes an annular generally rectangular base support structure 21 of monocrystalline silicon formed at the same time and out of the same wafer as the leaf spring structure 22. The leaf spring structure 22 includes a pair of mutually opposed E-spring portions 23 and 24. Each leaf spring portion 23 or 24 includes a pair of outer leaf spring leg portions 25 disposed on opposite sides of a central leaf spring leg portion 26. Each of the leaf spring leg portions is separated by a relatively narrow gap 27, as of 0.001 inch wide.

The outer leaf spring portions 25 are supported from the annular base support structure 21 via inwardly directed boss portions 28. The outer ends of the outer leg leaf spring portions 25 are free to remove relative to the supports 21 and 28 in the direction of deflection of the spring structure, i.e., in a direction normal to the plane of the leaf spring 22. The outer ends of the outer leaf spring legs 25 are joined together by means of a laterally directed spring portion which is also connected to the outer ends of the central leaf spring leg portion 26. The inner ends of the central leaf spring portions 26 of both E-shaped spring portions 23 and 24 are joined together as a continuous extension of the central leg 26.

Piezoresistive elements 29 are formed in the leaf spring portions in regions of maximum stress thereof such as near the junctions of the outer leaf leg portions 25 and the support boss 28. These piezoresistive strain elements pick up an electrical signal which is proportional to the strain and thus proportional to the deflection of the leaf spring structure 22.

The gaps 27 are sealed in a fluid tight manner by means of compliant membrane or diaphragm portions 31 bridging the gaps 27 in the spring structure 22 and between the spring 22 and the annular support structure 21. Thus, in the case of a gauge pressure measuring device, atmospheric pressure is applied to one side of the spring structure 22, whereas the pressure to be measured PG is applied to the opposite side of the spring 22. The pressure differential thereacross, which is the gauge pressure is detected by the piezoresistive strain elements 29, amplified by amplifier 16 and fed to an output terminal of the device in the terminal array 17.

Referring now to FIGS. 3–7 there is shown a method for producing batches of the pressure transducers 12 in accordance with one embodiment of the present invention. More particularly, a wafer 33 of monocrystalline silicon, having the <100> crystallographic plane as the top and bottom major surfaces thereof is photoetched with an array of leaf spring patterns 22, each leaf spring pattern being surrounded by an accompanying rectangular frame pattern corresponding to the outer edge of the support structure 21. Other suitable wafer materials include, monocrystalline nonmetallic materials such as, germanium, quartz, and gallium arsenide.

In the first etching step, the spring pattern is etched into the top face of the wafer 33 to produce a plurality of grooves 34 which are to define the leaf spring patterns, as aforedescribed. In a typical example, the wafer 33 has a thickness of 10 mils and a diameter of 3 to 5 inches and the grooves 34 are oriented parallel to certain crystallographic axes. An anisotropic etch, such as sodium hydroxide and water, is utilized for etching the precise grooves 34. In a typical example the grooves 34 are etched to a depth of one to several mils. After the grooves have been etched, the piezoresistive elements 29 are formed by conventional photolithographic techniques including, etching, diffusion, and followed by oxidation to provide a passivating layer.

After the piezoresistors 29 have been formed they are intraconnected to a plurality of connector pad portions 35 formed along the periphery of the support structure 21 by evaporating a metal layer, such as aluminum, onto the top surface of the wafer. Then the metal layer is etched through an exposed and developed photoresist layer to define the patterns of metallization and pads making the intraconnect.

As a part of this metallization step, or in a subsequent step, a photoresist layer 36 as of one to several mils in thickness is deposited over the major surface of the wafer 33 and into the grooves 34. The photoresist is then exposed to a pattern of optical radiation to which the photoresist material is sensitive to expose the photoresist in the regions of the patterns so that when the photoresist material is developed in a conventional manner the photoresist material remains in the region of the grooves as shown at 37. The grooves 34 are subsequently to form the gaps 27.

The top surface of the wafer 33 is then coated with a metal layer such as chromium, gold, tantalum, copper or the like to a thickness to form the desired membrane or diaphragm 31. In a preferred embodiment, the membrane material 31 includes sputter deposited tantalum and gold or chromium and gold. The diaphragm 31 can be of relatively small thickness, as of a few microns, depending upon the pressure differential to be supported across the leaf spring structure. The diaphragms 31 are convoluted to provide a high degree of compliance relative to the compliance of the leaf spring structure 22 to be formed.

In a subsequent step, the diaphragms 31, together with the electrical circuitry and so forth on the top side of the wafer 33' are protected by a suitable protective coating, as of wax, while the backside of the wafer 33 is etched to produce a recess 38 which intersects with the recesses 34 to define the gaps 27 in the resultant spring structure 22. After the gaps 27 have been opened up into the back recess 38, the photoresist material 37 is stripped by a conventional stripper leaving the fluid tight compliant membranes 31 sealing the spring structure while permitting deflection of the spring structure under a pressure differential thereacross without introducing a substantial spring constant due to the sealing diaphragms 31.

The various protective coatings are then stripped from the wafer and the individual pressure transducers can be probed and tested before the wafer 33 is segmented into the individual pressure transducer chips. After testing, the individual transducer chips are separated as by sawing, etching or scribing and dicing as is conventional in the semiconductor art.

Referring now to FIGS. 8-10 there is shown an alternative embodiment of the pressure transducer for use where there are higher values of pressure differences to be exerted across the spring structure 22. More particularly, a second wafer 41 similar to the first wafer 33 is made relatively thick, as of a few to 10 mils in thickness, and is etched on the top side with a recess 42 of substantially smaller normal projected area than that of the spring structure 22. Also, the bottom side of the wafer 41 is recessed slightly at 43 as by etching to permit a space between the spring structure and the underside of the wafer 41. In addition, the wafer 41 is etched through in regions 44 in registration with the contact pads 35 to permit probing access to the pads 35.

A bump 45, as of 1 to 5 mils in height, is deposited in the center of the central leaf spring portion 26, such bump 45 being relatively small in normal projected area, as of 1-100 square mils. The bump 45 is conveniently formed on the spring 26 as by electrolytic deposition through a photolithographic mask. The bump 45 passes through an aligned aperture 46 in the cover wafer 41, but initially, when the diaphragm 31 is formed, the aperture 46 is not etched through. More particularly, that portion of the wafer is as shown in FIG. 9. The bottom surface of the top recess 42 is covered with a photoresist layer 47 to an appropriate thickness of one to several mils as previously described with regard to FIG. 7. The photoresist layer 47 is then exposed to a pattern of radiation which is to subsequently provide ridges 48 circling the lip of the to be formed aperture 46 in the wafer 41. The photoresist layer 47 is then developed and diaphragm material such as gold, chromium, tantalum or multiple layers of the aforementioned metals deposited over portions of the exposed wafer 41 and the developed photoresist ridges 48 circling the proposed apertures 46. After the diaphragm material 31 has been deposited it is suitably masked and the excess metallization removed as by etching.

After the diaphragms 31 are suitably protected by protective coating, as of wax, the backside of the wafer 41 is etched to define the aperture 46 which intersects with the ridges 48 so that the photoresist or other suitable material can be removed by a suitable stripper. The wafer 41 having the various diaphragms 31 formed thereon is then sealed in registration over the top surface of the spring structure to the support frame portions 21 by any one of a plurality of suitable die attach techniques at 20. In an alternative embodiment, see FIG. 15, the wafer 41 with the diaphragms 31 formed therein is sealed over the bottom side of the recessed first wafer 33 and the bump 45 extends away from an unetched central projection 40 on the central leaf spring 26 from the opposite side to that shown in FIG. 8. In another alternative embodiment, see FIG. 16, the wafer 41 is etched with recesses through both major faces thereof to form compliant diaphragm portions 30 therein which abut the bumps 45 for providing mechanical coupling between the compliant diaphragm 30 and the central leaf 26 of the leaf spring 22. The periphery support portions of the etched diaphragms are sealed in a fluid tight manner to the spring support structures 21 as by conventional die attach methods. In addition, the wafer 41 with diaphragms 30 may be sealed to the lower side of the spring support structures in the manner as shown in FIG. 15.

In a typical example, for a spring structure 22 having a normal projected area of approximately 15,000 square mils, the aperture 46 and diaphragm 31 can have an effective normal projected area reduced to a range of 10 to 100 square mils, thereby reducing the force exerted on the spring structure, as contrasted with the embodiment of FIG. 4, to 1/1500 to 1/150 of the value of FIG. 4, thereby permitting the embodiment of FIGS. 8-10 to be utilized in environments where relatively high pressure differentials are to be measured by the pressure transducer 12. In a typical example of a barometer, base support structure 21 is sealed to a bottom plate 13 under vacuum conditions so that a vacuum is established in the recess portion 38 behind the spring structure 22. Atmospheric pressure is then exerted on the diaphragm 31 such pressure being transferred via the bump 45 to the center of the spring structue 22. Compliance of the basic spring structure 22 is chosen by dimensioning the leaves 25 and 26 so that the maximum force which is to be exerted on the spring structure 26 via the diaphragm 31 limits the displacement of the spring 22 to some desired range of displacement, as of 1 mil maximum.

Referring now to FIGS. 11 and 12 there is shown an alternative embodiment of the present invention. In the embodiment of FIGS. 11 and 12, the spring structure 22 is sealed in a fluid tight manner by means of a thin metallic diaphragm 51 sealed at its periphery around each of the spring structures 24 by means of a ring of sealant 52 such as epoxy, chromium-gold, etc., deposited upon the frame structure 21 as by any one or more conventional suitable techniques such as screening, evaporation through a mask or electrolytic deposition through a mask. In a typical example, the diaphragm 51 is formed by coining from a sheet or electrolytic deposition of a metallic material onto a form. The sheet containing an array of the diaphragms as of gold, copper, or the like is then placed in registration over the array of spring structures 22 in the wafer 33 and a bond obtained between the diaphragm 51 and the sealing rings 52. If desired, the central bump 45 may be made of the sealing material for bonding the central portion of the diaphragm 51 to the center leaf spring 26.

In a typical example, the diaphragm material 51 may be relatively thin, as of 3 to 30 microns, and the diaphragm 51 is apertured at 53 in registration with the contact pads 35 so that the resultant pressure transducers may be probed and tested while still a part of the wafer 33. After testing, the individual pressure transducers are separated from the wafer by conventional methods such as sawing, scribing, and the like. The diaphragm 51 may be separated as by slitting before the individual semiconductive frame members 21 are separated.

Referring now to FIGS. 13 and 14 there is shown another embodiment of the present invention. The embodiment of FIGS. 13 and 14 is similar to that of FIGS. 11 and 12 except that the sealing membrane or diaphragm 55 is made of a material which may be readily softened or sagged so as to cause the membrane to yield to provide the desired corrugations therein. More particularly, the membrane 55 is coated on its side which is to face the support structures 21 with a suitable adhesive coating. The membrane is then sealed to the support frames 21 and to the spring structures 25 and 26 as shown in FIG. 13. Then the membrane material 55 is softened as by heating or coating with a solvent and a maximum pressure differential is exerted across the softened membrane to cause the spring structure to be deflected and to cause the membrane to sag and yield with the deflected spring structure as shown in dotted lines of FIG. 13.

Next, the pressure differential across the membrane 55 is removed to cause the springs 22 to return to the untensioned state as shown in FIG. 14. The excess material caused by yielding of the membrane 55 forms the convolutions or corrugations in the sealing membrane 55 permitting subsequent deflection of the spring structure in response to pressure differentials thereacross without introducing hysteresis or substantial spring force due to the presence of the membrane 55. The membrane 55 is then coated with a suitable sealant such as a sputter coating of gold, tantalum or aluminum.

The advantage of the present invention is that the fluid pervious leaf spring structure may be utilized as a pressure transducer, thereby obtaining a more sensitive and more linear pressure transducer as contrasted with the prior art diaphragm solid state transducers. The sealing diaphragms of the present invention are conveniently formed by a batch process, thereby reducing the cost thereof.

What is claimed is:

1. In a batch method for fabricating solid state pressure transducers, the steps of:
   forming a batch of individual leaf spring structures connected to individual support structures in a wafer by recessing a batch of leaf spring patterns at selected locations through a first major face of said wafer to define said batch of leaf spring structures, individual ones of said leaf spring structures being separated by intervening portions of said wafer for defining individual support structures joined to individual ones of said leaf spring structures for support thereof;
   forming a batch of fluid tight partitioning structures each formed with a compliant portion for movement in accordance with a pressure differential applied thereacross;
   sealing individual ones of said partitioning structures over individual ones of said spring structures in a fluid tight manner; and
   mechanically coupling individual ones of said compliant portions of said partitioning structures with individual ones of said spring structures for movement therewith.

2. The method of claim 1 wherein the step of forming individual ones of said partitioning structures with a compliant portion comprises forming said compliant portion more compliant than corresponding individual ones of said spring structures, and wherein the step of mechanically coupling said spring structures with said partitioning structures includes, coupling said compliant portions of said partitioning structures in supportive engagement with individual ones of said spring structures for support therefrom and for movement therewith.

3. The method of claim 1 including the step of supporting a periphery of individual ones of said compliant partitioning portions from individual ones of said support structures.

4. The method of claim 1 wherein the step of forming the batch of fluid tight partitioning structures includes the steps of:
   forming a batch of recesses through the major face of a second wafer at selected locations for registration with individual ones of said leaf springs formed in said first wafer;
   forming a batch of fluid impervious membrane portions with individual membrane portions being sealed over individual ones of said recesses in said second wafer and defining said compliant portions of said partitioning structure; and
   sealing said second wafer over said first wafer with major faces of said first and second wafers being in mutually opposed relation and with individual ones of said membrane portions being in registration over respective individual ones of said leaf spring structures.

5. The method of claim 4 wherein individual ones of said recesses in said second wafer are recessed through said second wafer to define individual holes therethrough, each of said holes being formed having substantially less normal projected area than that of the corresponding individual leaf spring structure.

6. The method of claim 1 including the step of, forming a projection on individual ones of said leaf spring structures, such individual projections extending outwardly from a major face of said respective leaf spring structures in alignment with respective ones of said compliant portions of said partitioning structures for supportive engagement with respective ones of said compliant portions.

7. The method of claim 2 wherein the step of, forming the batch of fluid tight partitioning structures includes the steps of:
   sealing a unitary membrane in a fluid tight manner to individual ones of said support structures in said wafer; said membrane being more compliant than said leaf spring structures.

8. The method of claim 7 including the step of, sagging the unitary membrane into supportive engagement with said batch of leaf spring structures.

9. The method of claim 7 including the steps of, forming individual diaphragm portions in said membrane prior to sealing thereof to said wafer, individual ones of said diaphragms having greater compliance than that of individual ones of said spring structures, and sealing said membrane to said wafer with individual ones of said compliant diaphragms in registration with individual ones of said spring structures.

10. The method of claim 8 wherein the step of sagging said membrane includes the step of, softening the membrane material, applying a force across said softened membrane to cause said membrane to exceed its elastic limit and to be permanently stretched into sagging supportive engagement with said spring structures, and allowing the softened and sagged membrane to return to a less softened condition.

11. The method of claim 10 including the step of, coating the sagged membrane with a fluid impervious coating which is thinner than the membrane and which is more compliant than the individual spring structures.

12. The method of claim 2 wherein the step of forming said batch of fluid tight partitioning structures across individual ones of said spring structures includes the steps of:
   forming a pattern of strippable material on a major face of a wafer which is to receive said compliant portions of said partitioning structures;
   depositing a layer of membrane material over the pattern of strippable material and onto the wafer; and
   stripping the strippable material leaving the deposited layer as the membrane.

13. The method of claim 12 wherein the pattern of strippable material is formed by, coating a major face of the wafer with a coating of photoresist material, exposing said photoresist material to a pattern of optical radiation corresponding to a pattern of a batch of fluid sealing membranes to be formed over said spring structures, developing said exposed photoresist coating to expose the underlying wafer in accordance with the exposed pattern in said photoresist material.

14. The method of claim 13 wherein the developed pattern of photoresist material over which the membrane material is deposited is formed over a major face of said wafer in which said spring structures are to be formed, said developed photoresist coating including ridges spanning respective gaps between the spring structure to be formed and said outer supportive structure to be formed, such ridges running longitudinally of said gaps.

15. The method of claim 1 wherein the step of forming the batch of fluid tight partitioning structures includes the steps of:
   forming a batch of recesses through the major face of a second wafer at selected locations for registration with individual ones of said leaf spring structures in said first wafer;
   sealing said second wafer over said first wafer with the major faces of said first and second wafers being in mutually opposed relation and with individual ones of said recessed portions of said second wafer being in registration over respective individual ones of said leaf spring structures in said first wafer.

16. A solid state pressure transducer fabricated according to the steps of:
   forming a batch of individual leaf spring structures connected to individual support structures in a wafer by recessing a batch of leaf spring patterns at selected locations through a first major face of said wafer to define said batch of leaf spring structures, individual ones of said leaf spring structures being separated by intervening portions of said wafer for defining individual support structures joined to individual ones of said leaf spring structures for support thereof;
   forming a batch of fluid tight partitioning structures each formed with a compliant portion for movement in response to a pressure differential applied thereacross;
   sealing individual ones of said partitioning structures over individual ones of said spring structures in a fluid tight manner; and
   mechanically coupling individual ones of said compliant portions of said partitioning structures with individual ones of said spring structures for movement therewith.

17. The solid state pressure transducer of claim 16 wherein the solid state pressure transducer is fabricated according to the method wherein the step of, forming individual ones of said partitioning structures with a compliant portion comprises forming said compliant portion more compliant than corresponding individual ones of said spring structures, and wherein the step of mechanically coupling said spring structures with said partitioning structures includes, coupling said compliant portions of said partitioning structures in supportive engagement with individual ones of said spring structures for support therefrom and for movement therewith.

18. The apparatus of claim 16 wherein the step of forming the batch of fluid tight partitioning structures includes the steps of:
   forming a batch of recesses through the major face of a second wafer at selected locations for registration with individual ones of said leaf springs formed in said first wafer;
   forming a batch of fluid impervious membrane portions with individual membrane portions being sealed over individual ones of said recesses in said second wafer and defining said compliant portions of said partitioning structures; and
   sealing said second wafer over said first wafer with major faces of said first and second wafers being in mutually opposed relation and with individual ones of said membrane portions being in registration over respective individual ones of said leaf spring structures.

19. The apparatus of claim 18 wherein individual ones of said recesses in said second wafer are recessed through said second wafer to define individual holes therethrough, each of said holes being formed having substantially less normal projected area than that of the corresponding individual leaf spring structures.

20. The apparatus of claim 16 wherein the pressure transducer is fabricated according to the additional step of, forming a projection on individual ones of said leaf spring structures, such individual projections extending outwardly from a major face of said respective leaf spring structures in alignment with respective ones of said compliant portions of said partitioning structure of supportive engagement with respective ones of said compliant portions.

21. The apparatus of claim 16 wherein the step of forming the batch of fluid tight partitioning structures includes the steps of:
   forming a batch of recesses through the major face of a second wafer at selected locations for defining a batch of fluid tight partitioning second wafer portions each having a compliant portion for movement in response to a pressure differential applied thereacross;
   sealing individual second wafer portions over individual ones of said spring structures with the major faces of said first wafer portions and second wafer portions being in mutually opposed relation and with individual ones of said recessed portions of said second wafer portions being in registration over respective individual ones of said leaf spring structures.

* * * * *